Jan. 10, 1967  S. A. EMERSON ETAL  3,297,422
METHOD OF MAKING MOLDS FOR MULTI-FOCAL OPHTHALMIC LENSES
Filed April 5, 1963  2 Sheets-Sheet 1

INVENTORS
STANLEY A. EMERSON
GEORGE A. BEASLEY
BY
Kane, Dalsimer and Kane
ATTORNEYS Jan. 10, 1967  S. A. EMERSON ETAL  3,297,422
METHOD OF MAKING MOLDS FOR MULTI-FOCAL OPHTHALMIC LENSES
Filed April 5, 1963  2 Sheets-Sheet 2
FIG. 13
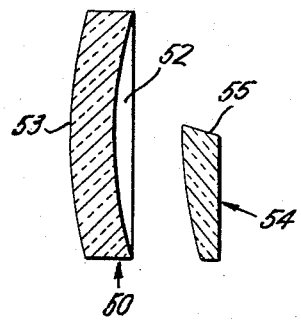
FIG. 14
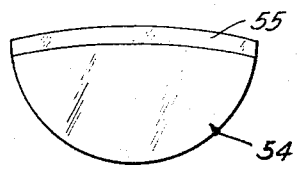
FIG. 15  FIG. 16  FIG. 17
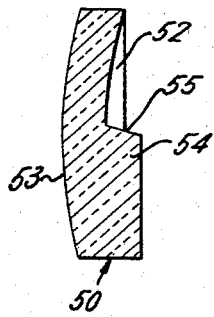 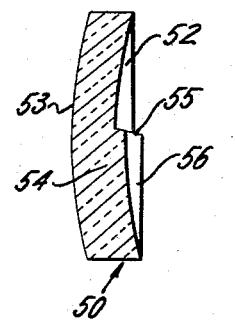 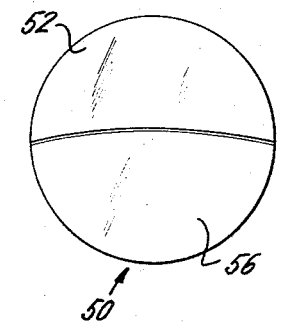
FIG. 18
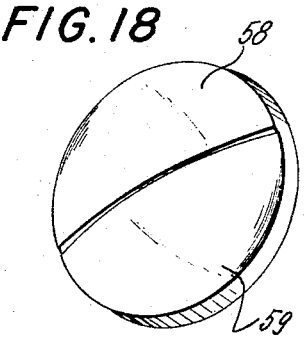
FIG. 3
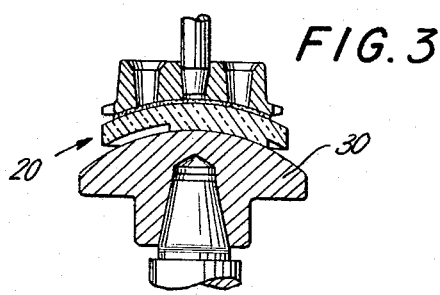
INVENTORS
STANLEY A. EMERSON
GEORGE A. BEASLEY
BY
*Kane, Dalsimer and Kane*
ATTORNEYS

United States Patent Office 3,297,422
Patented Jan. 10, 1967

3,297,422
METHOD OF MAKING MOLDS FOR MULTI-FOCAL OPHTHALMIC LENSES
Stanley A. Emerson and George A. Beasley, Fort Lauderdale, Fla., assignors to Univis, Inc., Fort Lauderdale, Fla., a corporation of Ohio
Filed Apr. 5, 1963, Ser. No. 270,964
5 Claims. (Cl. 65—54)

This invention relates to an improved method of making molds for use in the production of multi-focal plastic ophthalmic lens surfaces and also to the improved molds resulting from such method.

Plastic ophthalmic lenses have many advantages and are being produced and sold in increasing quantities. One advantage in the production of plastic lenses is that the lenses or lens blanks can be cast or molded in a single operation with one or both surfaces finished to the desired configuration or curvature. Preferably the lens blank is originally cast or molded with one surface only finished to the desired configuration and curvature and the prescription curve is subsequently applied to the other surface.

This of course is particularly advantageous in connection with multi-focal lenses where different curves of predetermined peripheral contour or configuration are formed at least on one surface for the different fields of vision. The different curves and configurations can be precisely and accurately formed in a simple molding or casting operation. However, the production of the molds for use in making multi-focal plastic lens surfaces presents difficulties in view of the multiple curves and configurations which must be accurately formed to close tolerance on at least one mold surface.

It is a prime object of the present invention to provide an improved method for making molds for the production of multi-focal ophthalmic lens surfaces whereby a mold surface having multiple curves and configurations can be accurately formed to close tolerance in an improved and simplified manner.

A further object is the provision of an improved mold made by such method in which the multiple curves forming the different fields of vision and the peripheral contour or configuration thereof are accurately controlled within close tolerances.

In accordance with our invention a glass mold blank is first formed with a first curve for molding one of the fields of vision. A glass segment having its rear face formed with a curved surface conforming with the first curve is fused or otherwise adhered to the face of the glass blank and a second curve for molding another field of vision is formed on the assembly so that one edge of the segment defines a boundary between the two curves. Additional segments may be similarly fused or otherwise adhered in sequential relationship and other curves for molding other fields of vision formed thereon.

In the accompanying drawings:

FIG. 3 is an elevational view showing the assembled blank and segment of FIG. 2 applied to a grinding tool to form the second curved surface thereon;

FIG. 13 is a side elevational sectional view of a glass mold blank and segment prior to being adhered thereto and suitable for making a mold for a different type of plastic multi-focal lens in which both fields of vision extend completely across the lens;

FIG. 14 is a perspective view of the glass segment shown in FIG. 13;

FIG. 15 is a side elevational sectional view of the glass mold blank of FIG. 13 after the segment has been adhered thereto and prior to forming the second curved surface thereon;

FIG. 16 is a similar side elevational sectional view showing the completed lens mold made in accordance with FIGS. 13, 14, and 15;

FIG. 17 is a front elevational view of the lens mold shown in FIG. 16; and

FIG. 18 is a perspective view of a plastic lens showing the multi-focal surface molded by means of the mold shown in FIGS. 16 and 17.

Our improved mold is made of any suitable material, preferably glass, on which may be formed a smooth, polished surface and which is inert to the plastic material to be molded thereon and which is unaffected by the molding temperatures.

Figure 1:
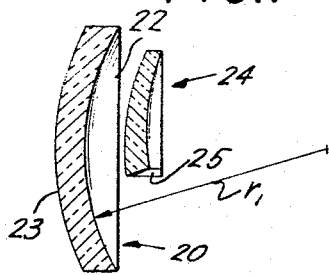
FIG. 1 is a side elevational sectional view showing the glass mold blank and a segment ready to be adhered to each other.

As a first step in making our mold we provide a glass mold blank large enough to mold the desired multi-focal plastic lens surface. A pressed glass mold blank is shown at 20 in FIG. 1.

We then generate and form on the face of the blank a first curved surface for use in molding the curved surface of one of the fields of vision on the plastic multi-focal lens surface as shown at 22. In this connection, in making a lens mold of the type shown in FIGS. 4 and 5 we prefer to first form the curved surface having the relatively shorter radius of curvature for use in molding the near field of vision.

Thus, the curved surface 22 first formed on the face of the glass mold blank has a relatively shorter radius of curvature than the other curved surface or surfaces to be formed thereon. The radius for forming the curved surface 22 is shown at $r_1$.

The first curved surface 22 should preferably cover the major portion of the front face of the glass mold blank. The curved surface may be formed on the glass blank by standard procedures used in the optical industry for generating lenses. Thus the surface may be first rough ground and then fine ground and finally polished to a smooth finish.

The rear face of the glass mold blank may be formed with a curved surface, generally conforming with one of the curved surfaces to be formed on the front face of the blank, as shown at 23.

The multi-focal lens surface is generally formed by the lens manufacturer on the convex surface of the lens blank and the prescription is generally applied to the concave surface of the lens blank. Since our mold is employed for molding the convex multi-focal lens surface, the curved surface 22 formed in the face of the glass mold blank is concave.

We next provide a small glass segment and fuse or otherwise adhere the segment to the first curved surface 22 of the face of the glass mold blank so that a second curved surface may be readily formed on the face, with one edge of the segment serving as a boundary line between portions of the curved surfaces. Thus in FIG. 1 we have shown a glass segment 24 having a lower edge 25 which serves to define a boundary line between portions of the curved surfaces. The edge 25 should be positioned so as to form the upper boundary line of the curved surface for molding the near field of vision and the segment should extend over the intermediate portion of the front face of the glass blank, and preferably terminate a short distance from the upper and side edges thereof.

The glass segment may be made of any suitable glass of the indicated type. It may be identical with the glass used in the glass blank or it may be glass having the same or a higher or lower fusing point.

The rear face of the glass segment is formed with a convex curved surface corresponding in curvature to the surface 22 of the glass mold blank. The rear face of the glass segment is applied to the curved surface 22 of the glass blank in proper alignment with the lower edge 25 of the segment defining the upper boundary line of the portion of the mold blank for molding the near vision field of the lens, and thereafter the segment is suitably adhered to the glass mold blank as by fusing. This may be accomplished by placing the assembly of the glass mold blank and segment on a slab of refractory material and then raising the temperature of the assembly to a point just above the softening point of the glass. The temperature is held at this point until sufficient intimate contact through fusing of the adjoining glass surfaces has occurred. The temperature is then slowly lowered through the annealing range for the glass employed and it is then lowered more rapidly until the parts can be withdrawn and handled without difficulty. The peak holding temperature varies with the type of glass. For crown glass approximately 700° C. serves very satisfactorily. It should be understood, however, that the segment may be adhered to the glass mold blank in any other satisfactory fashion.

Figure 2:
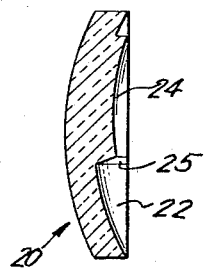
FIG. 2 is a similar side sectional elevational view showing the assembled segment and mold blank ready to have the second curved surface applied thereto.
Figure 4:
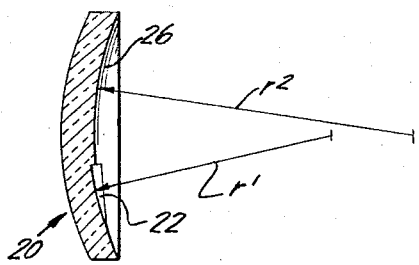
FIG. 4 is a side elevational sectional view of the completed mold after the second curved surface has been applied thereto.
Figure 5:
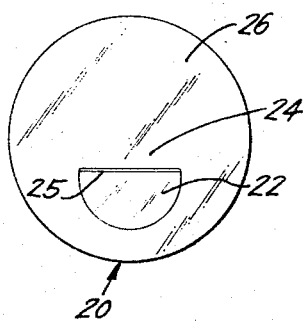
FIG. 5 is a front elevational view of the completed mold blank of FIG. 4.

The assembled glass mold blank and segment fused or otherwise adhered together are shown in FIG. 2. After the glass parts have been thus assembled a second curved surface having a longer radius of curvature corresponding to the radius of curvature of the distance field of vision is applied thereto and this second curved surface serves to mold the distance field of the plastic lens blank. In FIGS. 4 and 5 we have shown the finished glass mold after the second curved surface has been applied thereto. Thus, the first curved surface of shorter radius of curvature for use in molding the near field of vision is indicated at 22 and its radius is shown at $r_1$. The second curved surface, having a longer radius of curvature for use in molding the distance field of vision, is shown at 26 and its radius is shown at $r_2$.

The curved surface 26 may be formed in similar fashion to the curved surface 22 by standard lens surface generating tools and equipment of the proper radius. Thus the surface may first be rough ground, then fine ground and finally polished to a smooth finish.

Tools of the general type indicated at 30 in FIG. 3 may be used in forming the surface 26. In this connection, the glass blank is suitably blocked as shown and mounted in generating equipment and then applied to the surface of the tool.

As previously indicated, the upper boundary between the curved surface 22 for molding the near field of vision and the curved surface 26 for molding the distance field of vision is defined by the lower edge 25 of the glass segment 24. The size of the curved surface 22 remaining on the face of the glass blank may be controlled by the amount of glass which is removed from the face of the glass blank while the curved surface 26 is generated thereon. In other words, the size of the surface 22 decreases as more glass is ground from the face of the blank.

Figure 6:
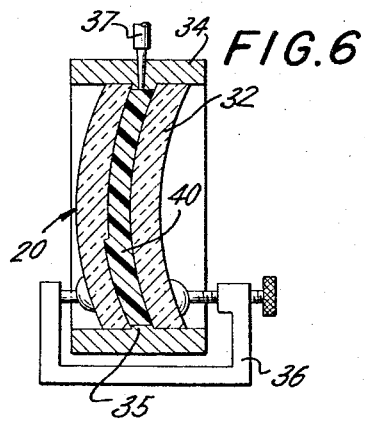
FIG. 6 is a partially diagrammatic sectional elevational view illustrating one form of mold assembly that may be used in molding a plastic lens with our improved mold.

As each of the curved surfaces 22 and 26 are formed on the face of the glass mold blank it is important that they be polished to a smooth finish so that the molded surface of the plastic lens will likewise be smooth. For the same reason, it is important that the lower edge 25 of segment 24 be polished to a smooth finish before being assembled with the glass mold blank. This edge should also be disposed at a slight draft angle as shown to facilitate the withdrawal of the plastic lens blank from the mold. The completed glass mold of FIGS. 4 and 5 may be used in any known manner for molding a plastic multi-focal lens surface. Thus as shown in FIG. 6, the glass mold 20 for molding the multi-focal plastic lens surface may be assembled in spaced relationship with a mold 32 for molding the opposite surface of the plastic lens blank. The mold 32 has a convex surface with a smooth polished finish for molding the concave surface of the plastic lens blank. The two molds 20 and 32 are held in properly assembled relationship within the ring 34 having an inwardly projecting spacing rib 35 extending around its inner surface and against which the two molds 20 and 32 are pressed as by means of C-clamps 36. Only one such clamp is shown, but it should be understood that a number of these clamps are disposed around the mold assembly. The liquid plastic material or monomer is suitably introduced into the mold assembly as at 37. In this connection, the lens blanks may be made of any of the known optical plastic materials, such as: polymerized methyl methacrylate resin or polymerized methyl diethylene glycol di(allyl carbonate).

The resin or monomer is introduced into the cavity of the mold assembly at 37 until the cavity is filled. The plastic lens 40 is allowed to solidify or polymerize by placing the assembly in an oven for curing. When the curing process is complete the mold assembly is removed from the oven and disassembled. The molds 20 and 32 can then be readily removed from the plastic lens blank.

During the molding operation, the molding surfaces of the two molds should be absolutely clean and the surrounding atmosphere should be dust free, so as to provide a plastic lens blank of the desired good optical quality.

Figure 7:
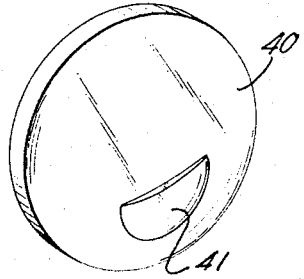
FIG. 7 is a perspective view of a plastic lens showing the multi-focal lens surface that may be molded with our improved mold.

The molded plastic lens blank is shown at 40 in FIG. 7. It will be seen that it has a multi-focal surface with a surface 41 of shorter radius of curvature molded by the curved surface 22 serving as the near field of vision and a surface 40 of longer radius of curvature molded by the surface 26 of the mold and serving as the distance field of vision.

Figure 8:
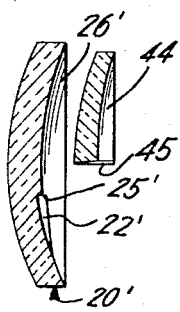
FIG. 8 is a sectional side elevational view showing a further step in applying a second glass segment to a mold of the type shown in FIGS. 4 and 5 so that a third curved surface may be applied thereto.

The mold heretofore described is designed for molding the indicated type of bifocal plastic lens surface. It will be understood that our invention is applicable to molds for making many other types of multi-focal plastic lens surfaces. Thus, it may be applied to molds for making bifocal lenses with near fields of vision of varying shapes and sizes. It also is applicable to the making of molds for forming trifocal lenses as shown in FIGS. 8 to 12. In FIG. 8 we have shown a mold blank 20′ similar to the finished mold 20 shown in FIGS. 4 and 5, and made in a similar manner. The front face of the glass mold blank is formed with a first curved surface 22′ of shorter radius of curvature serving as the near field of vision. It is also formed with a second curved surface 26′ of relatively longer radius of curvature. However, instead of serving as the distance field of vision the curved surface 26' serves as the intermediate field of vision.

In order to form the distance field of vision having the longest radius of curvature, we apply to the curved surface 26' of glass blank 20' a second glass segment 44 having a convex curved surface on its rear face of the same radius of curvature as the curved surface 26' and having a lower edge 45 which serves to define the upper boundary line of the portion of the curved surface 26' serving to mold the near field of vision.

Figure 9:
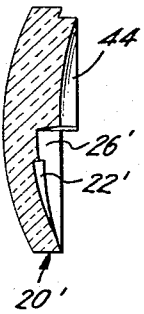
FIG. 9 is a view similar to FIG. 8 after the segment has been adhered to the mold.

Thus the segment is suitably fused or otherwise adhered to the surface 26' of the glass mold blank with the lower edge 45 positioned to properly define the upper boundary of the intermediate field of vision, and with the edges of the segment spaced from the side and top edges of the glass mold blank, as shown in FIG. 9.

A third curved surface of longest radius of curvature and serving to mold the plastic surface of the distance field of vision is then formed on the face thereof as shown at 46 by suitable lens surface generating equipment as described above. Thus, rough grinding, fine grinding and polishing tools of appropriate radius of curvature may be applied to the face of the glass mold blank in a manner similar to that shown in FIG. 3 until the surface 46 has been properly formed and polished to a smooth finish and so as to reduce the near and intermediate fields of vision to appropriate size.

Figure 10:
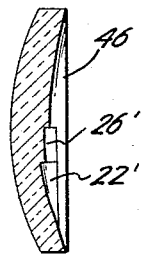
FIG. 10 is a similar view showing the completed mold after the third curved surface has been applied thereto and which is suitable for molding a tri-focal plastic lens surface.
Figure 11:
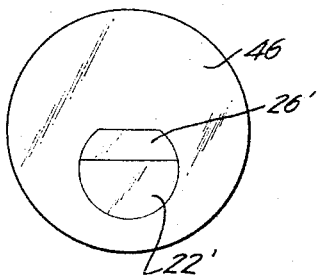
FIG. 11 is a front elevational view of the tri-focal lens mold shown in FIG. 10.
Figure 12:
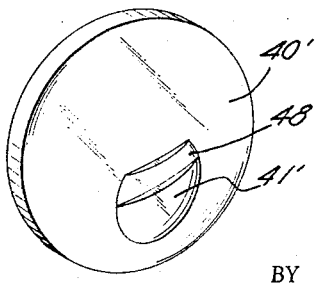
FIG. 12 is a perspective view of a molded plastic lens showing the tri-focal surface molded by means of the mold shown in FIGS. 10 and 11.

The completed glass mold for molding plastic trifocal lens surfaces is shown in FIGS. 10 and 11. This mold may be assembled and used in any suitable fashion as for instance as shown in FIG. 6 so as to mold a plastic trifocal lens blank of the type shown in FIG. 12. Thus, the plastic lens blank has a near field of vision 41' with a relatively short radius of curvature molded by the first curved surface 22' of the mold. It has an intermediate field of vision 48 of intermediate radius of curvature formed by the second curved surface 26' of the glass mold and it has a distance field of vision 40' of relatively longer radius of curvature formed by the third curved surface 46 of the mold.

In forming the second and third curved surfaces on the face of the glass mold blank shown in FIGS. 1 to 12 the first and the second curved surfaces may be protected from being marred by applying thereto a removable protective coating made of a soluble or readily fusable resin or gum or other protective material. This protective coating may be removed after the mold is completed by dissolving it or melting it.

As previously indicated, our invention is applicable to molds for forming plastic multi-focal lens surfaces in which the fields of vision have varying peripheral configurations. In FIGS. 13 through 18 we have illustrated our invention as applied to the making of a mold for a multi-focal lens in which the near field of vision extends across the entire width of the lens and in which the fields of vision are monocentric and substantially merge adjacent the central portion of the lens. To form this type of mold we first provide a glass mold blank 50 and form on the front face thereof a first curved surface 52. This curved surface, however, is preferably of relatively longer radius of curvature and serves to mold the plastic surface of the distance field of vision. The glass mold blank 50 preferably has a convexly curved rear face 53 which conforms generally with the curvature of one of the curves to be formed on the front face. The curved surface 52 is generated as previously described and is polished to a smooth finish.

I also provide a glass segment 54 and form on the back face thereof a convexly curved surface of the same radius of curvature as the first curved surface 52 of the glass mold blank. The upper edge of the glass segment shown at 55 is disposed at a slight draft angle to facilitate the withdrawal of the molded plastic lens from the mold. The edge 55 also serves to define the boundary between the near and distance fields of vision.

In this case, the glass segment preferably extends across the entire width of the blank and also extends to the side and lower edges thereof. The upper edge 55 may be straight or may be convexly curved from end to end as shown. The curved back face of the segment is applied to the first curved surface 52 of the glass mold blank and is fused or otherwise adhered thereto in the manner shown in FIG. 15.

Thereafter, a second curved surface is formed on the face of the assembled blank particularly on the surface of the fused segment 54. This curved surface is of relatively shorter radius of curvature and is shown at 56. It serves to mold the plastic surface of the near field of vision.

The curved surface 56 may be formed on the face of the blank by applying to the fused segment portion thereof rough and fine grinding tools and a polishing tool of appropriate radius of curvature. The surface 56 should be polished to a smooth finish.

The completed glass mold for molding the plastic lens surfaces having fields of vision extending completely across the lens is shown in FIGS. 16 and 17. The second curved surface 56 of relatively shorter radius of curvature is bounded by the edge 55 which divides it from the first curve surface for molding the distance field of vision. The edge 55 is of relatively greater height at the two side edges of the mold than at the central portion thereof. The edge 55 is of minimum height at the central portion and may substantially merge with the two curved surfaces.

The completed mold shown in FIGS. 16 and 17 may be assembled and used in any suitable manner, as for instance in the manner indicated in FIG. 6 so as to produce a plastic lens blank of the type shown in FIG. 18. This plastic lens blank has a multi-focal surface with a distance field of vision 58 of relatively longer radius of curvature formed by the first curved surface of the mold 52 and also has a near field of vision 59 of relatively shorter radius of curvature formed by the second curved surface of the mold 56.

It will thus be seen that we have provided an improved method for making molds for the production of multi-focal ophthalmic lenses and lens blanks whereby a mold surface having multiple curves and configurations can be accurately formed to close tolerance in an improved and simplified manner. It will be seen that we have provided an improved mold made by such method in which the multiple curves for forming the different fields of vision and the peripheral contours and configurations thereof are accurately controlled within close tolerances.

The procedure illustrated in FIG. 6 of the drawings and described in the accompanying text is sometimes referred to as casting. It should be understood that the expression "molding" as used herein encompasses casting as well as molding.

It should be understood that modifications may be made in the illustrated and described embodiments of our invention without departing from the invention as set forth in the accompanying claims. Thus by employing segments of different sizes and shapes molds for making many different forms of multi-focal plastic lens surfaces can be provided.

We claim:

1. The method of making a mold for use in molding multi-focal ophthalmic lens surfaces on the front surface of the lens from plastic material which comprises: first providing a glass blank; grinding and polishing on the rear face of the blank a first concave curved surface for molding one of the fields of vision of the front lens surface and having a curvature complementary to the desired curvature of the near field of vision and covering a portion of the rear face; providing a small glass segment having a back convex curved surface curved to conform with the first curved surface of the blank; applying the glass segment to the face of the glass blank with the curved back surface in contact with the first curved surface of the blank and adhering them to each other; and, finally, grinding and polishing on the near face of the assembly including at least the face of the segment a second concave surface for molding another field of vision of the lens surface and having a curvature complementary to the desired curvature of said another field of vision so that an edge of the segment defines a boundary between the two fields of vision.

2. The method of making a mold for use in molding multi-focal ophthalmic lens surfaces from plastic material as set forth in claim 1 in which the segment is adhered to the blank by being fused thereto.

3. The method of making a mold for use in molding multi-focal ophthalmic lens surfaces from plastic material as set forth in claim 1 in which a second small glass segment having a back concave surface curved to conform with the second convex curved surface of the blank is applied to the second curved surface of the blank and adhered thereto and thereafter a third concave curved surface is formed on the face of the assembly for molding a further field of vision of the lens surface and having a curvature complementary to the desired curvature of the further field of vision so that an edge of the segment defines a boundary between the third curved surface and another of the curved surfaces.

4. A mold for use in molding from plastic material multi-focal ophthalmic lens surfaces on the front surface of the lens with said surfaces having at least two fields of vision with one having a relatively shorter radius of curvature and the other having a relatively longer radius of curvature which comprises: a glass blank having a front and rear face, the rear face being ground and polished and defining a first concave curved surface for molding one of the fields of vision of the front lens surface, the first concave surface having a relatively shorter radius of curvature and having a curvature complementary to the desired curvature of the near field of vision; a glass segment adhered to the rear surface of the blank and having a back convex curved surface curved to conform with the first curved surface of the blank, the curved back surface of the segment being in contact with and adhered to the first curved surface on the blank, a second ground and polished concave surface on at least the glass segment for molding another field of vision of the lens surface and having a relatively longer radius of curvature complementary to the desired curvature of said another field of vision, the segment having an edge defining a boundary between the two fields of vision.

5. A mold for use in molding from plastic material multi-focal ophthalmic lens surfaces as set forth in claim 4 in which a second glass segment having a back convex curved surface is adhered to the second concave surface, and a third curved surface is formed at least partially in the second segment for molding a further field of vision of the lens surface having a longer radius of curvature than the first and second fields of vision, said second segment having an edge serving as a boundary between the third curved surface and another curved surface.

References Cited by the Examiner
UNITED STATES PATENTS

| | | | |
|---|---|---|---|
| 2,049,094 | 7/1936 | Tillyer | 65—38 |
| 2,755,706 | 7/1956 | Cole | 65—42 |
| 2,890,486 | 6/1959 | Crandon. | |
| 2,964,501 | 12/1960 | Sarofeen. | |
| 3,109,696 | 11/1963 | Whitney | 264—1 |

DONALL H. SYLVESTER, *Primary Examiner.*

F. W. MIGA, *Assistant Examiner.*